United States Patent
Yakumaru et al.

(10) Patent No.: US 9,928,820 B2
(45) Date of Patent: Mar. 27, 2018

(54) FUEL CELL SYSTEM

(71) Applicant: Panasonic Intellectual Property Management Co., Ltd., Osaka (JP)

(72) Inventors: Yuuichi Yakumaru, Osaka (JP); Akinori Yukimasa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/249,512

(22) Filed: Aug. 29, 2016

(65) Prior Publication Data
US 2017/0092255 A1 Mar. 30, 2017

(30) Foreign Application Priority Data
Sep. 24, 2015 (JP) ................ 2015-186845

(51) Int. Cl.
| | |
|---|---|
| *G10K 11/16* | (2006.01) |
| *G10K 11/172* | (2006.01) |
| *H01M 8/04* | (2016.01) |
| *H01M 8/04082* | (2016.01) |
| *H01M 8/0438* | (2016.01) |
| *H01M 8/04089* | (2016.01) |
| *F01N 1/02* | (2006.01) |
| *H01M 8/0662* | (2016.01) |
| *H01M 8/04694* | (2016.01) |

(52) U.S. Cl.
CPC .......... *G10K 11/161* (2013.01); *G10K 11/172* (2013.01); *H01M 8/04089* (2013.01); *H01M 8/04201* (2013.01); *H01M 8/04395* (2013.01); *F01N 1/023* (2013.01); *H01M 8/04694* (2013.01); *H01M 8/0687* (2013.01)

(58) Field of Classification Search
CPC ............... G10K 11/161; G10K 11/172; H01M 8/04201; H01M 8/04395
See application file for complete search history.

(56) References Cited

U.S. PATENT DOCUMENTS

| | | | | |
|---|---|---|---|---|
| 6,608,463 | B1 * | 8/2003 | Kelly | ................ H01M 8/04089 320/101 |
| 2007/0289653 | A1 * | 12/2007 | Harris | ..................... F16L 55/04 138/30 |

FOREIGN PATENT DOCUMENTS

| | | |
|---|---|---|
| EP | 1387429 | 2/2004 |
| JP | 2005-116353 | 4/2005 |
| JP | 2008-084564 | 4/2008 |
| JP | 2011-100627 | 5/2011 |

(Continued)

OTHER PUBLICATIONS

The Extended European Search Report dated Nov. 25, 2016 for the related European Patent Application No. 16186972.2.

*Primary Examiner* — Brittany Raymond
(74) *Attorney, Agent, or Firm* — McDermott Will & Emery LLP

(57) ABSTRACT

A fuel cell system includes a fuel cell, an air supplier that supplies air to a cathode of the fuel cell, a flow rate sensor that senses an air flow rate, and a silencer that reduces sound of a certain frequency through interference of an acoustic wave, the flow rate sensor, the air supplier, and the fuel cell being arranged in an air passage in series in order named from an upstream side of flow of the air, the silencer being arranged in a branch portion of the air passage, the branch portion being between the flow rate sensor and the air supplier.

3 Claims, 4 Drawing Sheets

(56) References Cited

FOREIGN PATENT DOCUMENTS

| JP | 2011-113697 | 6/2011 |
|----|-------------|--------|
| JP | 2015-153569 | 8/2015 |

* cited by examiner

FUEL CELL SYSTEM

BACKGROUND

1. Technical Field

The present disclosure relates to a fuel cell system.

2. Description of the Related Art

A fuel cell system takes out chemical energy as electrical energy by supplying hydrogen containing gas and oxygen containing gas (air) to a fuel cell and promoting electrochemical reaction between the hydrogen and the oxygen. The fuel cell system is a high-efficiency electric power generation system, which can easily utilize thermal energy caused in electric power generation operation, and is accordingly a dispersive electric power generation system with high efficiency of energy utilization.

For example, such a fuel cell system includes an air supplier that supplies air to a cathode of a fuel cell, such as a pump, a reformer that supplies hydrogen to an anode of the fuel cell, an electric power conversion device (an inverter) that converts electrical energy caused in the fuel cell into commercial voltage frequencies, a heat recovery device that recovers heat caused in the fuel cell and the reformer through heat exchange, a blower that ventilates the inside of a casing (a package), such as a ventilating fan, and a radiator that is used for cooling when no exhaust heat is utilized.

When the above-described fuel cell system is used as a household electric power generator, the fuel cell system is typically placed outdoors because of the need for ensuring placement space for the fuel cell system. To cover part or all of the electric power used at home, all-day operation is performed in many cases. Thus, when noise is caused during operation of the fuel cell system, displeasure is given not only to the user but also to the neighborhood. Decrease in the noise of the fuel cell system is therefore necessary so as not to give such displeasure to the user or the neighborhood during daytime as a matter of course, and in particular, during nighttime.

Most of the noise that originates from the fuel cell system is caused by the air supplier, which is a constituent device of the fuel cell system. Noise occurs as suction sound, vibrations caused during operation, and the like of the air supplier propagate to the piping, exterior, and the like of the system. Thus, various methods are reviewed so as to inhibit the sound from the air supplier, which is the noise source of the fuel cell system.

Examples of the configurations that have been proposed include a configuration where a noise blocking wall is attached to the exterior of a fuel cell system (see for example, Japanese Unexamined Patent Application Publication No. 2008-84564), a configuration where a silencer is attached to an air inlet (see for example, Japanese Examined Utility Model Registration Application Publication No. 3-13593), and a configuration where noise that escapes from the exterior of a fuel cell system is reduced by making the cross-sectional area of a passage of an air inlet small (see for example, Japanese Patent No. 5560665).

Further, a configuration where for example, a resonance silencer is provided in a position in a passage through which air flows has been proposed (see for example, Japanese Unexamined Patent Application Publication No. 2005-116353, Japanese Unexamined Patent Application Publication No. 2011-113697, and Japanese Unexamined Patent Application Publication No. 2015-153569).

However, Japanese Unexamined Patent Application Publication No. 2008-84564 and Japanese Examined Utility Model Registration Application Publication No. 3-13593 each have an issue that increase in size and cost of a device is incurred. Japanese Patent No. 5560665 has an issue that pressure loss of an air passage increases. Japanese Unexamined Patent Application Publication No. 2005-116353, Japanese Unexamined Patent Application Publication No. 2011-113697, and Japanese Unexamined Patent Application Publication No. 2015-153569 lack sufficient review of an issue brought by pressure pulsation of air, which is caused by an air supplier. Such issues are described in detail in an embodiment below.

SUMMARY

One non-limiting and exemplary embodiment, which has been made in view of such circumstances, provides a fuel cell system that can inhibit increase in size and cost of a device and increase in pressure loss of an air passage more desirably than conventional fuel cell systems in reducing noise caused by an air supplier. Further, the fuel cell system can be more suitably adapted to an issue that occurs with pressure pulsation of air, which is caused by the air supplier, than the conventional fuel cell systems.

In one general aspect, the techniques disclosed here feature a fuel cell system including a fuel cell, an air supplier that supplies air to a cathode of the fuel cell, a flow rate sensor that senses an air flow rate, and a silencer that reduces sound of a certain frequency through interference of an acoustic wave, the flow rate sensor, the air supplier, and the fuel cell being arranged in an air passage in series in order named from an upstream side of flow of the air, the silencer being arranged in a branch portion of the air passage, the branch portion being between the flow rate sensor and the air supplier.

A fuel cell system according to an aspect of the present disclosure can inhibit increase in size and cost of a device and increase in pressure loss of an air passage more desirably than conventional fuel cell systems in reducing noise caused by an air supplier. Further, the fuel cell system can be more suitably adapted to an issue that occurs with pressure pulsation of air, which is caused by the air supplier, than the conventional fuel cell systems.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

In a configuration where a noise blocking wall is attached to the exterior of a fuel cell system as in Japanese Unexamined Patent Application Publication No. 2008-84564, noise in a range of high frequencies equal to or higher than 1 kHz for example, where transmission loss of incident energy is large, can be insulated relatively easily. However, to insulate noise in a range of low frequencies lower than 1 kHz for example, where transmission loss is small, it is necessary to note setting of the thickness of the noise blocking wall and selection of a material of the noise blocking wall. Depending on a case, increase in cost of a device and increase in size of the device caused as the noise blocking wall is thickened, and the like are highly likely incurred.

Even a configuration where a silencer is attached to an air inlet so as to obtain noise attenuation effect as in Japanese Examined Utility Model Registration Application Publication No. 3-13593 needs to ensure space in an air filter and may fail to be adapted to a device becoming more compact.

Figure 7:
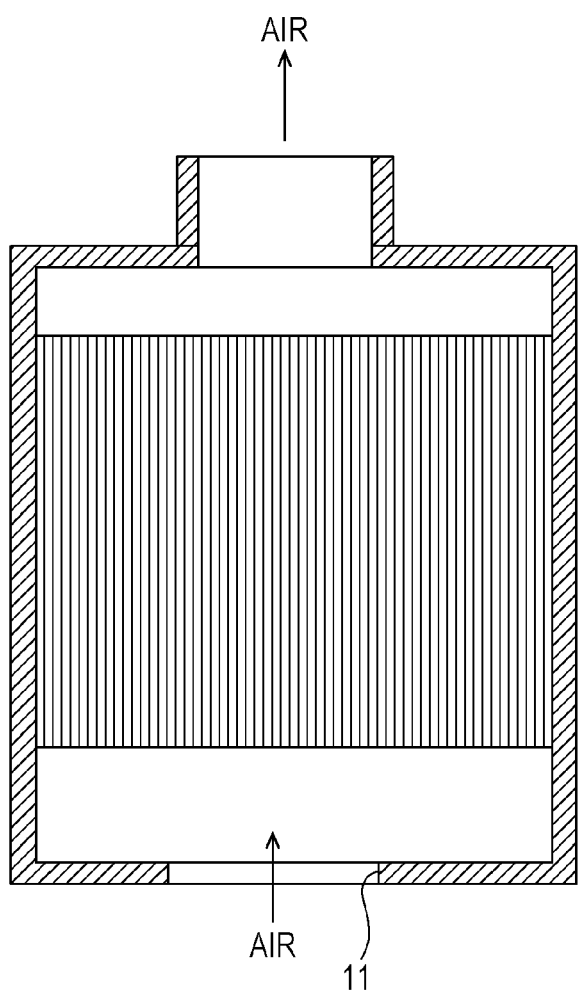
FIG. 7 illustrates an example of a fuel cell system according to related art.

According to a configuration where the cross-sectional area of an air passage of an air inlet is made small as in Japanese Patent No. 5560665 (see FIG. 7), it may be expected to obtain noise attenuation effect but pressure loss of the air passage increases. As a result, power for an air supplier increases and electric power generated in a fuel cell is consumed so as to cover the power, and the amount of the electric power generation that a user can utilize decreases.

The present inventors have therefore conceived a configuration where for example, a resonance silencer is provided in a branch portion of an air passage as in Japanese Unexamined Patent Application Publication No. 2005-116353, Japanese Unexamined Patent Application Publication No. 2011-113697, and Japanese Unexamined Patent Application Publication No. 2015-153569 but found that an issue that occurs with pressure pulsation of air, which is caused by an air supplier, is not sufficiently reviewed in Japanese Unexamined Patent Application Publication No. 2005-116353, Japanese Unexamined Patent Application Publication No. 2011-113697, or Japanese Unexamined Patent Application Publication No. 2015-153569.

For example, when pressure pulsation of air is caused in a case where a flow rate sensor, whose output signal easily changes by being affected by pressure pulsation of air, is provided in an air passage, the change in the output of the flow rate sensor can make it difficult to control the flow rate of the air sent to a cathode of a fuel cell. Such an issue is, however, not reviewed at all in Japanese Unexamined Patent Application Publication No. 2005-116353, Japanese Unexamined Patent Application Publication No. 2011-113697, or Japanese Unexamined Patent Application Publication No. 2015-153569.

Thus, a fuel cell system according to a first aspect of the present disclosure includes a fuel cell, an air supplier that supplies air to a cathode of the fuel cell, a flow rate sensor that senses an air flow rate, and a silencer that reduces sound of a certain frequency through interference of an acoustic wave, the flow rate sensor, the air supplier, and the fuel cell being arranged in an air passage in series in order named from an upstream side of flow of the air, the silencer being arranged in a branch portion of the air passage, the branch portion being between the flow rate sensor and the air supplier.

In the fuel cell system according to the first aspect, a silencer of a fuel cell system according to a second aspect of the present disclosure may, further comprising, an air filter that includes an air inlet, the air filter, the flow rate sensor, the air supplier, and the fuel cell being arranged in the air passage in series in order named from the upstream side of the flow of the air.

In the fuel cell system according to the first aspect, a silencer of a fuel cell system according to a third aspect of the present disclosure may reduce pressure pulsation of the air at the certain frequency.

Such a configuration can inhibit increase in size and cost of a device and increase in pressure loss of an air passage more desirably than conventional fuel cell systems in reducing noise caused by an air supplier. For example, when a silencer is provided in a branch portion of the air passage, which couples the flow rate sensor and the air supplier together, pressure loss of the air passage can be prevented from increasing more desirably than a case where the silencer is arranged in series in the air passage.

In addition, such a configuration can be more suitably adapted to an issue that occurs with pressure pulsation of air, which is caused by an air supplier, than conventional fuel cell systems. Specifically, since the silencer is arranged in the branch portion of the air passage, which is between the flow rate sensor and the air supplier, pressure pulsation of air at a certain frequency, which is caused by the air supplier, can be reduced. Thus, even when the flow rate sensor whose output signal easily changes by being affected by the pressure pulsation of air is provided in the air passage, change in the output of the flow rate sensor can be inhibited and the flow rate of the air sent to the cathode of the fuel cell can be controlled to be a suitable amount. Accordingly, high-efficiency operation of the fuel cell system can be performed while maintaining the reliability of the fuel cell.

When the operation frequency of the air supplier is a constant commercial frequency, which is 50 Hz for example, a multiple of 50 Hz can be a sound source frequency. In this case, when air suction sound at the air inlet of the air filter has an audio frequency in a range of low frequencies lower than 1 kHz for example, resonance occurs at at least one of frequencies of 50, 100, 150, 200, 250, 300 Hz . . . , and a frequency lower than 1000 Hz, the sound pressure level of the noise rises and pressure pulsation of air is caused at these frequencies.

According to the present aspect, noise and pressure pulsation of air at a certain resonance frequency are reduced through interference of an acoustic wave by using the above-described silencer.

In the fuel cell system according to the first aspect or the second aspect, an air supplier of a fuel cell system according to a forth aspect of the present disclosure may be a pump that controls the air flow rate by changing amplitude while an operation frequency is constant.

Such a pump can easily induce noise and pressure pulsation of air at a certain operation frequency. However, the fuel cell system according to the present aspect can suitably reduce noise and pressure pulsation of air at a certain operation frequency because of the above-described silencer even when such a pump is used.

An embodiment and embodiment examples of the present disclosure are described below with reference to the accompanying drawings. The embodiment and the embodiment examples below provide specific examples of the present disclosure. The values, shapes, materials, constituents, arrangement positions, connection forms, and the like of the constituents in the embodiment and the embodiment examples are mere examples and are not intended to limit the present disclosure. Among the constituents of the embodiment and the embodiment examples, the constituents that are not recited in the independent claim indicating the most superordinate concept of the present disclosure can be explained as arbitrary constituents. Descriptions of the constituents denoted with the same references in the drawings may be omitted. In the drawings, each constituent is schematically illustrated so as to be easily understood while shapes, dimensional ratios, and the like may be inaccurate.

EMBODIMENT

<Device Configuration>

Figure 1:
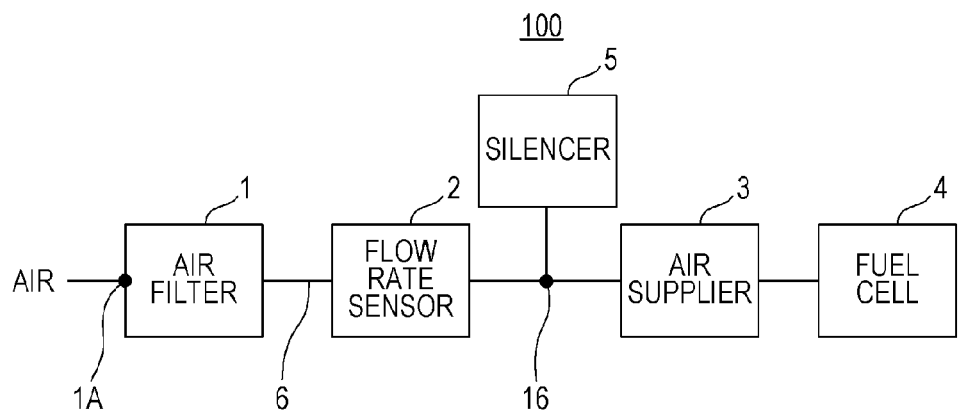
FIG. 1 illustrates an example of a fuel cell system according to an embodiment.

FIG. 1 illustrates an example of a fuel cell system according to an embodiment.

As illustrated in FIG. 1, a fuel cell system 100 includes an air filter 1, a flow rate sensor 2, an air supplier 3, a fuel cell 4, and a silencer 5.

The fuel cell 4 generates electric power using hydrogen gas and air. When the fuel cell system 100 includes a reformer for example, reforming source gas in the reformer generates hydrogen containing gas and the hydrogen containing gas is supplied to an anode of the fuel cell 4. Since such a reformer is known, illustration and detailed description thereof are omitted. The fuel cell 4 may be any kind. Examples of the fuel cell 4 include a polyelectrolyte fuel cell, a solid oxide fuel cell, and a phosphoric acid fuel cell.

The air filter 1 includes an air inlet 1A. The exterior of the air filter 1 may be formed from resin for example, and a filter material fills the inside. The air filter 1 is a given constituent, which may be provided as desired if necessary.

The air supplier 3 supplies air to a cathode of the fuel cell 4. The air supplier 3 may have any configuration as long as the air supplier 3 can supply air to the cathode of the fuel cell 4. Examples of the air supplier 3 include a pump that controls an air flow rate by changing amplitude while an operation frequency is constant, and a blower that controls the air flow rate by changing the operation frequency. The former, which is the pump, may be a piston-type pump or a diaphragm-type electromagnetic pump for example. The latter, which is the blower, may be a blower or fan with rotary wings for example.

The flow rate sensor 2 senses the air flow rate. Specifically, the flow rate sensor 2 senses the flow rate of the air sent by the air supplier 3 to the cathode of the fuel cell 4. The flow rate sensor 2 may have any configuration as long as the flow rate sensor 2 can sense the air flow rate.

A controller, which is not illustrated, can perform feedback control based on the sensing data of the flow rate sensor 2 so that the flow rate of the air that flows through an air passage 6 is a desirable amount. Accordingly, the flow rate of the air sent to the cathode of the fuel cell 4 can be suitably controlled.

The silencer 5 reduces sound at certain frequencies through interference of acoustic waves. Specific examples of the silencer 5 are described in first and second embodiment examples.

When the operation frequency of the air supplier 3 is a constant commercial frequency, which is 50 Hz for example, a multiple of 50 Hz can be a sound source frequency. In this case, when air suction sound at the air inlet 1A of the air filter 1 has an audio frequency in a range of low frequencies lower than 1 kHz for example, resonance occurs at at least one of frequencies of 50, 100, 150, 200, 250, 300 Hz . . . , and a frequency lower than 1000 Hz, the sound pressure level of the noise rises and pressure pulsation of air is caused at such frequencies. When the sound source is covered with a structure, such as a noise blocking wall, as in Japanese Unexamined Patent Application Publication No. 2008-84564, the noise attenuation effect of the noise blocking wall can be obtained for noise with relatively high frequencies. If the frequency of the noise is relatively low, however, transmission loss of the noise is small at the noise blocking wall and the noise attenuation effect of the noise blocking wall is difficult to be obtained.

Thus, in the present embodiment, noise and pressure pulsation of air at certain resonance frequencies are reduced through interference of acoustic waves by using the above-described silencer 5. The air filter 1, the flow rate sensor 2, the air supplier 3, and the fuel cell 4 are arranged in the air passage 6 in series in this order, that is, in the order named from the upstream side of the flow of air, and the silencer 5 is arranged in a branch portion 16 of the air passage 6, which is between the flow rate sensor 2 and the air supplier 3.

As described above, in reducing noise caused by the air supplier 3, increase in size and cost of a device and increase in pressure loss of the air passage 6 can be inhibited more desirably than conventional fuel cell systems. For example, when the silencer 5 is provided in the branch portion 16 of the air passage 6, which couples the flow rate sensor 2 and the air supplier 3 together, pressure loss of the air passage 6 can be prevented from increasing more desirably than a case where the silencer 5 is arranged in series in the air passage 6.

Such a configuration can be more suitably adapted to an issue that occurs with pressure pulsation of air, which is caused by the air supplier 3, than conventional fuel cell systems. Specifically, since the silencer 5 is arranged in the branch portion 16 of the air passage 6, which is between the flow rate sensor 2 and the air supplier 3, pressure pulsation of air at a certain frequency, which is caused by the air supplier 2, can be reduced. Thus, even when the flow rate sensor 2 whose output signal easily changes by being affected by the pressure pulsation of air is provided in the air passage 6, change in the output of the flow rate sensor 2 can be inhibited and the flow rate of the air sent to the cathode of the fuel cell 4 can be controlled to be a suitable amount. Accordingly, high-efficiency operation of the fuel cell system 100 can be performed while maintaining the reliability of the fuel cell 4.

Particularly, even when a pump that can easily induce noise and pressure pulsation of air at an operation frequency, such as a diaphragm-type electromagnetic pump, is used, the noise and the pressure pulsation of the air at the operation frequency can be suitably reduced because of the above-described silencer 5.

First Embodiment Example

In the fuel cell system 100 according to the embodiment, the silencer 5 of the fuel cell system 100 according to a first embodiment example of the embodiment is a Helmholtz silencer 5A. The Helmholtz silencer 5A has a feature that its silencing effect is higher than that of a branch pipe silencer 5B, which is described below.

Figure 2:
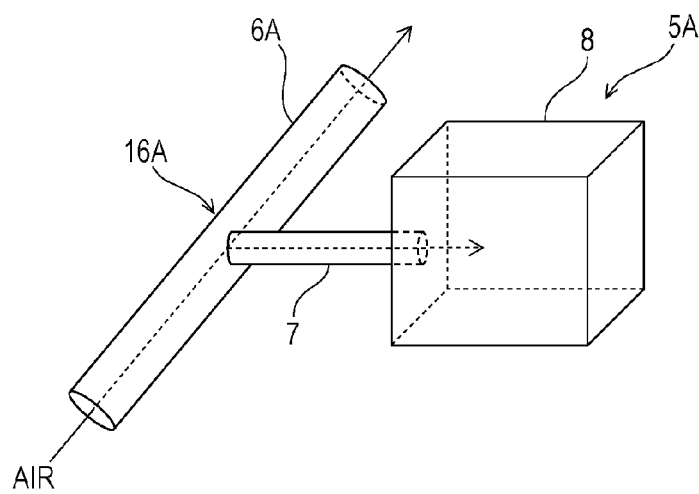
FIG. 2 illustrates an example of a Helmholtz silencer of a fuel cell system according to a first embodiment example of the embodiment.
Figure 3:
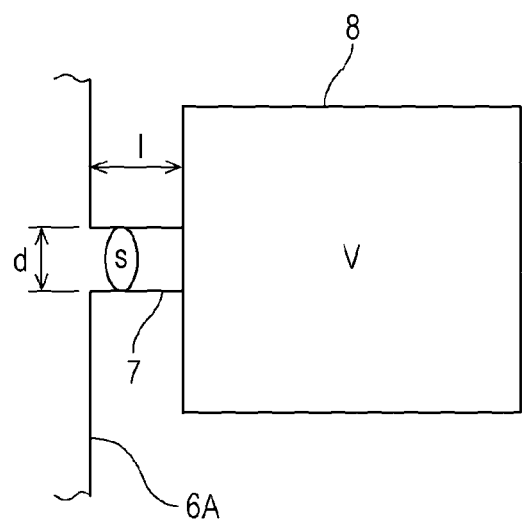
FIG. 3 illustrates an example of a basic configuration of the Helmholtz silencer.

FIG. 2 illustrates an example of the Helmholtz silencer 5A of the fuel cell system 100 according to the first embodiment example of the embodiment. FIG. 3 illustrates an example of a basic configuration of the Helmholtz silencer 5A.

The Helmholtz silencer 5A includes a cavity 8 and a neck 7. In a branch portion 16A of a principal pipe 6A that forms the air passage 6, the neck 7 is coupled to the principal pipe 6A so as to be approximately perpendicular to the principal pipe 6A and is also coupled to the cavity 8. Accordingly, the inside of the principal pipe 6A and the inside of the cavity 8 communicate in at least one portion through the neck 7. That is, as illustrated in FIG. 3, the cavity 8 with a volume V is linked to the inside of the principal pipe 6A through the neck 7, which has a length l (the lower-case letter of L) and includes a small opening with a cross-sectional area S, and air moves on the basis of a difference between pressure in the principal pipe 6A and pressure in the cavity 8.

The exterior of the Helmholtz silencer 5A may be formed from resin for example. The neck 7 may be formed so as to be integral with the cavity 8 and the principal pipe 6A or may be formed so as to be separate from the cavity 8 and the principal pipe 6A. The entire neck 7 may be arranged outside the cavity 8 or at least part of the neck 7 may be present in the cavity 8. The neck 7 may be formed of a straight pipe or may be formed of a bent pipe or a curved pipe, which bends at a middle position. The neck 7 may be formed of a flexible member, such as a bellows.

Silencing principles of the Helmholtz silencer 5A are described below.

In the cavity 8 short in size in comparison with the wavelength of sound, air serves as a spring. When the cavity 8 includes a small opening and the opening allows communication with the outside, air in the opening (the neck 7) moves as one cluster and the motion is mechanically similar to that of a single resonance system in which a weight hangs on a spring. This is called a Helmholtz resonator.

As illustrated in FIG. 3, a basic structure of the Helmholtz resonator is a pot-like container where the neck 7 and the cavity 8 are joined together. When an acoustic wave corresponding to a resonance frequency falls on the container, resonance occurs and air in the neck 7 strongly vibrates. At the time, sound is reradiated from the neck 7 and viscous drag acts on the wall of the pipe that forms the neck 7, and part of the energy of the incident acoustic wave is converted into heat. That is, the energy of the sound is lost because of friction loss and silencing effect occurs.

Typically, such a Helmholtz resonator has favorable silencing effect near a resonance frequency and has large silencing effect even on noise in a low-frequency range, which is difficult to be removed by a sound absorbing material. In addition, pressure loss of the air passage 6 is small. Thus, the Helmholtz resonator is rarely used for an ordinary silencing process and is more likely to be used for silencing of the vibration of a normal mode.

A resonance frequency $f_1$ of the Helmholtz resonator can be expressed by equation (1) below.

$$f_1 = c/2\pi \times \sqrt{(S/(V \times (l+0.8d)))} \quad (1)$$

In equation (1), c represents the sound velocity, l (the lower-case letter of L) represents the length of the neck 7, S represents the cross-sectional area of the neck 7, d represents the diameter of the neck 7, and V represents the volume of the cavity 8.

As expressed in equation (1), the resonance frequency $f_1$, that is, sound in a frequency band of a silencing target can be controlled by changing the cross-sectional area S of the neck 7, the length l of the neck 7, the diameter d of the neck 7, and the volume V of the cavity 8. For example, as the volume V of the cavity 8 decreases, the resonance frequency $f_1$ increases and as the cross-sectional area S of the neck 7 increases, the resonance frequency $f_1$ increases.

Figure 4:
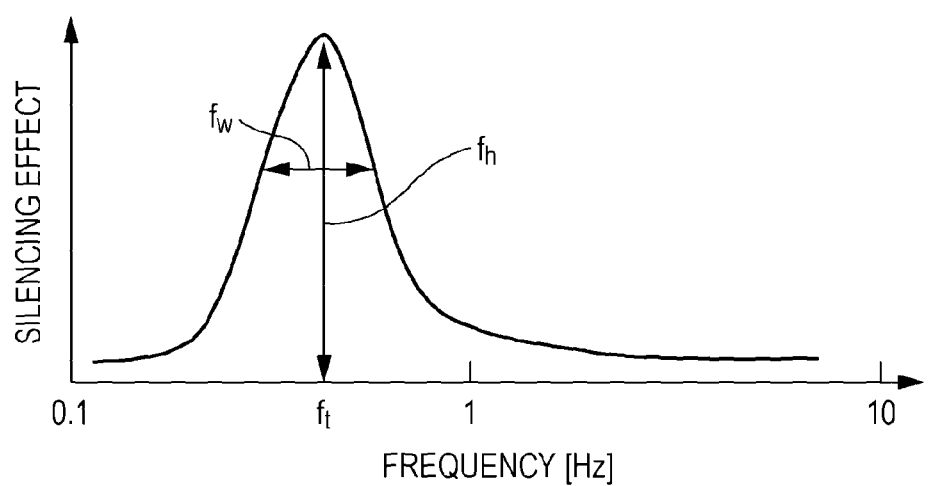
FIG. 4 is a graph used to describe silencing characteristics of the Helmholtz silencer.

In this manner, as illustrated in FIG. 4, the Helmholtz silencer 5A can bring silencing effect $f_h$ at a certain target frequency $f_t$ (a band width $f_w$) equal to the resonance frequency $f_1$. Parameters that decide the target frequency $f_t$ are for example, the volume V of the cavity 8, the length l of the neck 7, the cross-sectional area S of the neck 7, the diameter d of the neck 7, and the like. Thus, the Helmholtz silencer 5A can be obtained, which has the maximum silencing effect $f_h$ at a peak frequency of noise, by setting the above-described parameters so that the peak frequency of the noise and the target frequency $f_t$ of the Helmholtz silencer 5A agree with each other.

Figure 5:
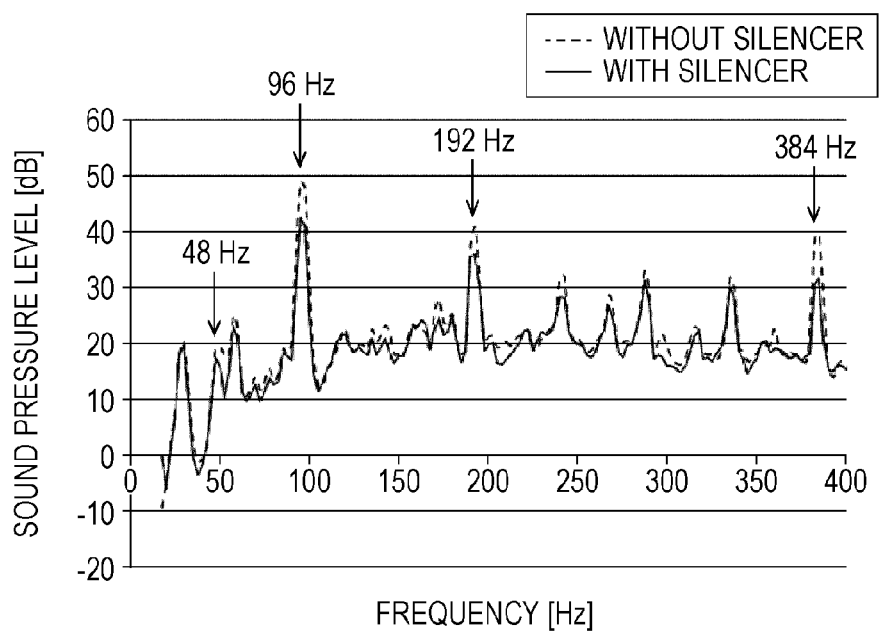
FIG. 5 illustrates an example of silencing characteristics of the Helmholtz silencer.

FIG. 5 illustrates an example of the silencing characteristics of the Helmholtz silencer 5A. In FIG. 5, while the horizontal axis indicates a frequency [Hz] and the vertical axis indicates a sound pressure level [dB], measurement results according to a fast Fourier transform (FFT) analyzer are illustrated in comparison between a case where the air passage 6 is provided with the Helmholtz silencer 5A and a case where the air passage 6 is not provided with the Helmholtz silencer 5A. In the present verification experiment, the target frequency $f_t$ is 48 Hz and a microphone for measuring the sound pressure level is arranged in a location approximately 1 m apart from the air filter 1.

As illustrated in FIG. 5, the sound pressure level of the noise is high at the operation frequency of the air supplier 3, which is 48 Hz for example, and the frequencies of the multiples thereof, which are 96 Hz, 192 Hz, and 384 Hz for example, and when the air passage 6 is provided with the Helmholtz silencer 5A, it is verified that the sound pressure level of the noise is suitably lowered at the above-mentioned frequencies and the silencing effect $f_h$ is obtained.

As described above, the use of the Helmholtz silencer 5A enables the noise and the pressure pulsation of air at the resonance frequency $f_1$, for example, to be reduced through interference of an acoustic wave. Thus, even when the flow rate sensor 2 whose output signal easily changes by being affected by the pressure pulsation of air is provided in the air passage 6, change in the output of the flow rate sensor 2 can be inhibited and the flow rate of the air sent to the cathode of the fuel cell 4 can be suitably controlled. Accordingly, high-efficiency operation of the fuel cell system 100 can be performed while maintaining the reliability of the fuel cell 4. When a sound absorbing material, such as a rock wool, is lined on the inner surfaces of the cavity 8, high-frequency noise can also be reduced.

When for example, the air supplier 3 is a pump that controls an air flow rate by changing amplitude while an operation frequency is constant, the sound pressure level of the noise is highest at the operation frequency. Since in this case, the Helmholtz silencer 5A is suitable for the silencing at the resonance frequency $f_1$, noise and pressure pulsation of air at the operation frequency can be suitably reduced by designing the Helmholtz silencer 5A so that the resonance frequency $f_1$ agrees with the operation frequency.

The Helmholtz silencer 5A is coupled to the principal pipe 6A via the branch portion 16A of the principal pipe 6A, which couples the flow rate sensor 2 and the air supplier 3 together, instead of being coupled in series to the principal pipe 6A that forms the air passage 6. Accordingly, abrupt change in air pressure, that is, increase in pressure loss of the principal pipe 6A can be suitably inhibited.

The above-described configuration and arrangement of the Helmholtz silencer 5A are examples and the present disclosure is not limited to the examples. For example, the number of Helmholtz silencers 5A may be two or more.

The fuel cell system 100 according to the present embodiment example may be configured so as to be similar to the fuel cell system 100 according to the embodiment except the above-described features.

Second Embodiment Example

In the fuel cell system 100 according to the embodiment, the silencer 5 of the fuel cell system 100 according to a second embodiment example of the embodiment is a branch pipe silencer 5B. The branch pipe silencer 5B has a feature that the branch pipe silencer 5B can be configured more easily than the above-described Helmholtz silencer 5A.

Figure 6:
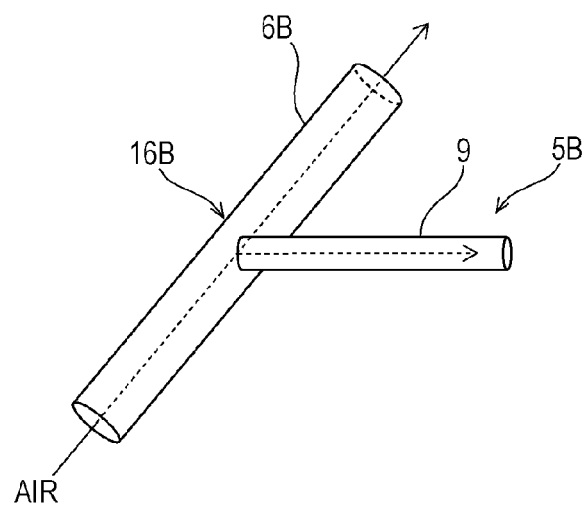
FIG. 6 illustrates an example of a branch pipe silencer of a fuel cell system according to a second embodiment example of the embodiment.

FIG. 6 illustrates an example of the branch pipe silencer 5B of the fuel cell system 100 according to the second embodiment example of the embodiment.

The branch pipe silencer 5B includes a branch pipe 9. In a branch portion 16B of a principal pipe 6B that forms the air passage 6, the branch pipe 9 is coupled to the principal pipe 6B so as to be approximately perpendicular to the principal pipe 6B and a top end of the branch pipe 9 is blocked. Accordingly, the inside of the principal pipe 6B and the inside of the branch pipe 9 communicate. The exterior of the branch pipe silencer 5B may be formed from resin for example.

In the branch pipe silencer 5B, noise and pressure pulsation of air at a certain resonance frequency $f_2$ can be reduced through interference of sound in the branch pipe 9.

The resonance frequency $f_2$ of the branch pipe silencer 5B can be expressed by equation (2) below.

$$f_2 = c/(4 \times (D+L)) \quad (2)$$

In equation (2), c represents the sound velocity, D represents the diameter of the branch pipe 9, and L represents the length of the branch pipe 9.

Since the silencing effect of the branch pipe silencer 5B at the resonance frequency $f_2$ is similar to the silencing effect of the above-described Helmholtz silencer 5A at the resonance frequency $f_1$, detailed descriptions thereof are omitted.

The above-described configuration and arrangement of the branch pipe silencer 5B are examples and the present disclosure is not limited to the examples. For example, the number of branch pipe silencers 5B may be two or more.

The fuel cell system 100 according to the present embodiment example may be configured so as to be similar to the fuel cell system 100 according to the embodiment except the above-described features.

A fuel cell system according to an aspect of the present disclosure can inhibit increase in size and cost of a device and increase in pressure loss of an air passage in reducing noise caused by an air supplier more desirably than conventional fuel cell systems. Thus, for example, an aspect of the present disclosure can be utilized for a stationary fuel cell system, a fuel cell system for a vehicle, and the like.

What is claimed is:

1. A fuel cell system comprising:
   a fuel cell;
   an air supplier that supplies air to a cathode of the fuel cell;
   a flow rate sensor that senses an air flow rate; and
   a Helmholtz silencer that reduces sound of a certain frequency through interference of an acoustic wave, wherein:
   the flow rate sensor, the air supplier, and the fuel cell are arranged in an air passage in series in order named from an upstream side of flow of the air, the silencer being arranged in a branch portion of the air passage, the branch portion being between the flow rate sensor and the air supplier,
   the silencer reduces pressure pulsation of the air at the certain frequency, and
   the air supplier is a diaphragm-type electromagnetic pump that controls the air flow rate by changing amplitude while an operation frequency is constant.

2. The fuel cell system according to claim 1, further comprising:
   an air filter that includes an air inlet,
   the air filter, the flow rate sensor, the air supplier, and the fuel cell being arranged in the air passage in series in order named from the upstream side of the flow of the air.

3. The fuel cell system according to claim 1, wherein the silencer is a branch pipe silencer.

* * * * *